Dec. 13, 1932. R. R. RUNDELL 1,890,829
ROPE TIGHTENER
Original Filed Feb. 24, 1930  2 Sheets-Sheet 1
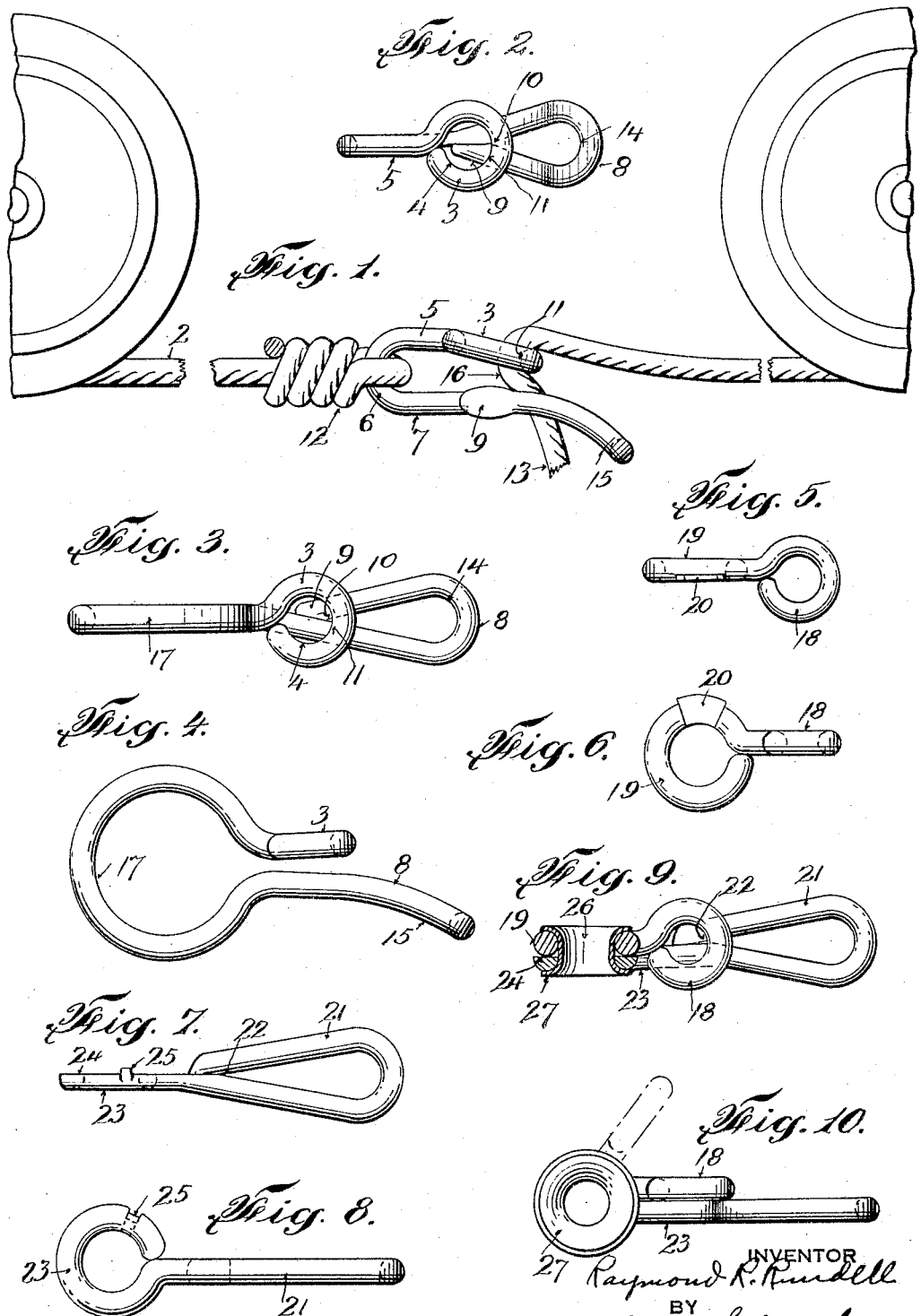

Dec. 13, 1932. R. R. RUNDELL 1,890,829
ROPE TIGHTENER
Original Filed Feb. 24, 1930  2 Sheets-Sheet 2
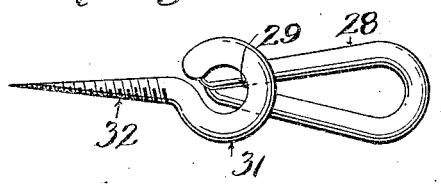
Fig. 11.
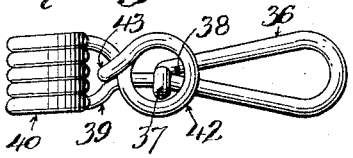
Fig. 14.
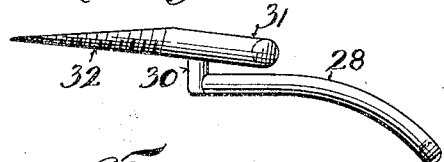
Fig. 12.
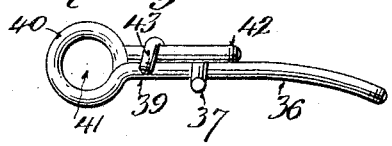
Fig. 15.
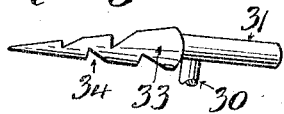
Fig. 13.
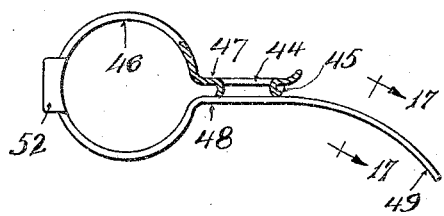
Fig. 16.
Fig. 17.
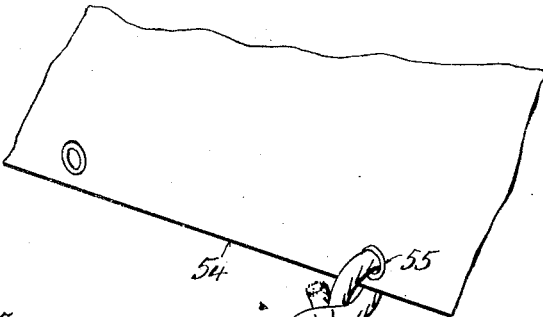
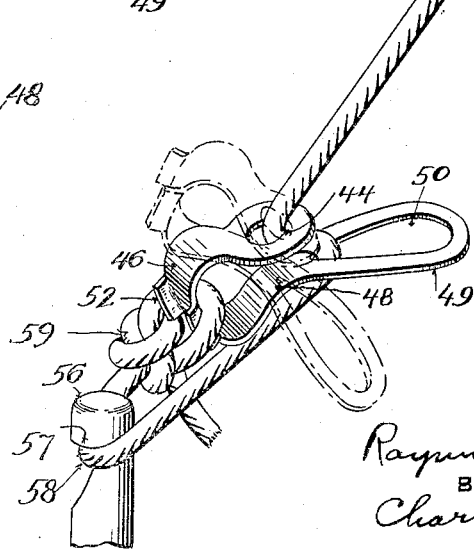
Fig. 18.
INVENTOR
Raymond R. Rundell
BY
Charles G. Hensley
ATTORNEY Patented Dec. 13, 1932

1,890,829

UNITED STATES PATENT OFFICE

RAYMOND R. RUNDELL, OF WATERVILLE, CONNECTICUT

ROPE TIGHTENER

Application filed February 24, 1930, Serial No. 430,690. Renewed October 28, 1932.

The present invention relates to a device or means for tightening and holding ropes, cables, cords, strings and the like and its application and uses are very numerous. It may be used for securing the ends of clotheslines together to facilitate taking up slack in the line and to provide an efficient and quick means for connecting the ends of the clothesline together or for connecting one end to a fixed support. It is also adapted to be used for tightening and holding the guy lines of tents; to secure the supporting ropes of hammocks and swings; and in fact the device may be used wherever a rope, wire or like member is to be secured.

One object of the invention is to provide a holder or tightener which is of such simple construction that it may be made very cheaply and in fact, cheap enough to compete favorably with all other fasteners. Another object is to provide a fastener which can be attached and removed very quickly and which permits the rope, cord or other form of line to be tightened or released quickly and with little effort.

Another object is to provide a device which will grip the rope or other member securely and which will hold the same with greater gripping action as the strain or pull on the rope is increased, so that there can be no slippage of the rope while the device is in action.

Another object is to provide a device which may be used in conjunction with ropes, cords, etc. of different diameters. Other objects and advantages will be set forth in the following detailed description of the invention.

In the drawings forming part of this application,

Figure 1 is an elevation of one form of my invention showing the same applied to a clothesline, Figure 2 is a plan view of the tightener shown in Figure 1, Figure 3 is a plan view of a modified form of the invention, Figure 4 is a side elevation of the same device which is shown in Figure 3, Figure 5 is a plan view of one of the members of another modified form of tightener, Figure 6 is an elevation thereof, Figure 7 is a plan view of the other member of this modified form of the invention, Figure 8 is an elevation of the same member, Figure 9 is a sectional view of the complete tightener embodying the modification shown partly in Figures 5-8 inclusive, Figure 10 is a side elevation of the same form of the invention, Figure 11 is a plan view of another modified form of the invention, Figure 12 is a side elevation thereof, Figure 13 is a detail view showing another type of shank which may be used with a device such as is shown in Figures 11 and 12, Figure 14 is a plan view and Figure 15 is an elevation of another modified form of the invention, Figure 16 is a longitudinal sectional view showing the tightener made of flat instead of round metal, Figure 17 is a sectional view taken on the line 17—17 of Figure 16, and Figure 18 is a perspective view showing the same form of tightener as in Figures 16 and 17 as used for a tightener for tent guy ropes.

In Figures 1 and 2 I have shown one embodiment of my invention as utilized for connecting the ends of a clothes line and I will first describe this form of the invention.

In Figure 1 I have shown the two clothes line wheels 1 which may be attached to objects spaced some distance apart and over these pulleys runs the clothes line 2, the same being connected with the present device to make an endless line. The device in this form is made of bent wire and is, therefore, round in cross section. The wire is bent substantially circular at 3 to form a loop or eye having an opening 4 therein through which the line may pass. From this eye or loop the wire projects first outwardly at 5 and then it is bent to form a yoke or curve at 6 and it is thence extended forwardly at 7 under the portion 5 and the second end of the wire is bent to form a loop 8. The metal where the end 9 is pressed in close relation to the metal which diverges to form the loop 5 meets at a sharp angle to form a crotch 10 substantially V shape and this crotch is preferably so disposed that it will lie in a vertical plane which is adjacent the portion 11 of the upper eye or loop, as shown in the plan view in Figure 2.

In attaching this device to the clothes line, one end of the line is passed through the yoke 6 and tied about the line or spliced thereto, as shown at 12, or connected in any other manner, so that the loop of the rope engages with the yoke 6 of the fastening device, as shown in Figure 1. The opposite or free end of the line is passed first through the aperture 4 in the eye 3 and thence through the opening 14, the free end of the line hanging from the lower member 8. In order to tighten the line upon the pulleys by taking up slack, the projecting end 13 of the clothes line is grasped in the hand and is drawn toward the right in Figure 1 in order to draw the line through the eye 3 and through the member 8. By drawing the free end of the line toward the right in Figure 1, the gripping action of the tightening device is released because the pressure of the line comes on the forward portion 11 of the eye 3 and in the crotch 10.

As the free end of the line is directed to the right in Figure 1, it moves into the wider portion of the opening 14 and is released from the gripping action of the V shaped crotch 10. There is, therefore, nothing to prevent the rope from being drawn through the eye 3. When the rope has been sufficiently tightened or taken up, the free end 13 is swung to the left in Figure 1 and released. This throws the line into the V shaped crotch 10 although the tendency of the rope to straighten will cause it to move into the crotch.

The line is now tightly gripped and no amount of pull will release the end which is gripped by the tightener. In fact, the greater the strain put on the main portions of the line, the tighter will be the grip between the eye member 3 and the crotch member 8 and the line because the strain on the line tends to pull the crotch member towards the eye member and thus further press the line into the V shaped crotch 10 and increase its grip thereon. Even if the eye member is not drawn toward the crotch member because the device is too rigid to yield, the tendency of the rope to straighten will cause it to be held tightly in the crotch. To loosen or release the line, the free end 13 is simply moved to the right in Figure 1, whereupon the line may freely pass through the eye 3 as it is no longer wedged or gripped by the crotch member. It will be observed in the drawing that the crotch member is curved outwardly and downwardly, as indicated at 15 in Figure 1, and this formation increases the tendency of the line to move into the crotch 10 during the tightening or gripping operation. It also facilitates gripping the crotch member if desired, to move it away from the eye member to quickly release the line. In this form of the invention the device is resilient and its natural tendency is for the eye and crotch members to move towards each other. It will be observed that the forward end of the crotch 10 is disposed under or slightly beyond the forward edge 11 of the eye 3, so that the rope or line is compelled to bend in the form of a loop, as shown at 16 in Figure 1, when it is locked by the tightening device. This insures the gripping of the line by the co-operating crotch and eye members.

I will now describe the construction shown in Figures 3 and 4.

In this form of the device the crotch member and the eye member are the same as in the form first described but the loop or yoke portion 17 which receives one end of the line or rope similar to the yoke in the first form is made circular and much larger than the corresponding portion in the first form in order to increase the resiliency by which the crotch and eye members are moved toward each other. In other respects the device corresponds with the form first described.

I will next describe the form of the invention shown in Figures 5 to 10 inclusive. In this form the eye member and crotch member are made separately and are attached by a rivet or eyelet. The eye member as shown in Figures 5 and 6 consists of the eye 18 corresponding with the eye 3 in the previous forms and the wire or rod is bent to form a loop or second eye 19 disposed in a plane at right angles to the rope engaging eye 18. This portion 19 of the eye member is provided with a flattened face 20 on one side thereof for a purpose which will be shortly explained. The crotch member is provided with a loop 21 having the V shaped crotch 22 corresponding with the similar member of the previous forms. The wire of the crotch member, as shown in Figures 7 and 8, is formed into an eye or loop 23 lying at right angles to the crotch member 21. This eye member is provided with a flattened surface 24 on one face and with a lug 25 projecting upwardly therefrom. The crotch and eye members are assembled by placing the flat face 24 of the eye 23 against one side of the eye 19 so that the projection or lug 25 enters the recess 20. An eyelet 26 is inserted through the eyes 19, 23 and the ends of the eyelet are turned over, as shown at 27 to secure the movable members of the tightener together, as shown in Figures 9 and 10.

It will be apparent that the eye and crotch members may swing in relation to each other, the eyelet forming the pivot for both, but the extent of movement is limited in one direction by the engagement of the projection 25 with one edge of the socket 20, so that, as shown in Figure 10, the eye member can swing away from the crotch member only a limited extent, or sufficient to permit the rope to be threaded through the tightener. This prevents the eye member from swinging around and coming on the wrong side of the crotch member. The rope is threaded through the eye and crotch members, the same as in the previous forms of the invention. In this form of the device there is no resilient action tending to move the eye and crotch members toward each other, so that they depend upon the tension on the rope when threaded through the eye and crotch members to draw these two towards each other and clamp the rope.

In Figures 11 to 13 I have shown the invention embodied in a form suitable for securing the end of a rope to a post or other stationary fixture. In this construction the wire from which the tightener is formed is bent to form the crotch member 28 having the V shaped crotch 29 corresponding to the similar member of the previous devices. The wire is bent upwardly at 30 and it is thence continued in circular form to provide the eye 31 bearing a similar relation in its position to the crotch member as the eye in the previous forms. As shown in Figures 11 and 12 there is a shank 32 formed from the wire extending from the eye 31 and this shank is tapered and provided with a screw thread. This device may be applied to a post or other stationary member by screwing the shank 32 into the wood to secure the tightener in place.

The rope may be threaded through the eye and crotch members in a similar manner to the previously described forms. In Figure 13 I have shown the shank 33 provided with notches 34 the device otherwise being the same as shown in Figures 11 and 12. This form of device may be applied to a stationary support by driving the notched shank into the support the same as driving a nail.

In Figures 14 and 15 I have shown the tightener made of a continuous piece of bent wire having a spring portion of several convolutions. The crotch member is formed by bending the wire into a loop 36 and twisting the end 37 around the wire itself to secure it, and the shape of the wire is such as to form a V shaped crotch 38 corresponding in its function with the crotch in previous forms. The wire extends outwardly from the crotch member as shown at 39 and is then bent in helical form, as shown at 40, to provide a plurality of turns or convolutions lying close to each other to form a tubular portion through the opening 41 of which one end of the rope may be passed and tied. The wire at the opposite end of the convolutions is curved into a loop or eye 42 and the free end is twisted around the wire as shown at 43 to lock this end and prevent the eye from opening. The free end of the rope is threaded through the eye 42 and the crotch member 36 in the same manner as in the first form. The spring portion 40 has a tendency to move the eye member towards the crotch member to increase the resilient pressure for clamping the rope, where additional spring action is desirable.

In Figures 16 to 18 inclusive I have shown my invention embodied in a slightly different form and applied as a tightener for tent guy ropes.

The tightener in this form is made of flat, resilient metal blanked and formed to produce the following parts: One end of the metal is provided with an opening 44 which forms the eye member of the tightener and the metal around the edge of this opening is preferably rolled inwardly, as shown at 45 to prevent the rope from cutting against the edge of the opening. From this eye member the plate is bent into the form of a loop or eye 46 which serves the same function as the yoke 6 in the first described form. From this loop or eye the plate extends outwardly and substantially parallel with the eye member 47 at 48 and the end is bent outwardly and downwardly as shown at 49. This portion of the fastener is provided with an opening 50 for the rope, one end of which is formed with the V shaped crotch 51 corresponding in position and function with the crotch members in the first described forms. Preferably, the loop member 46 is provided with curved extensions 52 integral therewith, to form smooth portions with which the loop on one end of the rope engages, and these prevent the rope from cutting against the sharp edges which would be presented if the metal were not turned back in the manner shown. As shown in Figure 17, the metal around the edge of the opening 50 or at least at the crotch portion thereof, is rounded or made oval in cross section, as shown at 53 in order to avoid sharp edges and thus avoid cutting the rope where it passes through the crotch. In Figure 18 I have shown one of the edges 54 of a side wall, fly, or other portion of a tent having one end of a rope tied through the eyelet 55 on the tent.

At 56 I have shown a stake or other means for holding the tent wall or flap and this post or peg is provided with a notch 57 to be engaged by a loop 58 of the rope. The free end of the tent rope is first passed through the eye 44, thence through the opening 50, thence through the loop member 46 and it is tied to the latter as shown at 59. The tightener remains attached to the rope in the manner described and the rope may be permanently connected with the tent wall or flap. In using this type of device the tightener may be slid down the rope by tilting it at an angle as shown in the dotted lines in Figure 18, in order to release the grip of the eye and crotch members on the rope until the loop 58 extends a sufficient distance from the tent wall to be engaged with the notch of the peg 56. After the loop of the rope has been engaged with the peg, the tightening member is tilted as shown in dotted lines in Figure 18 and is then pulled along the rope toward the tent wall or away from the peg, and when the rope is sufficiently tightened between the tent wall and the peg, the tightening device is released. The rope being under tension, the crotch and eye members will tightly lock that portion of the rope which passes through these members in the same manner that the crotch and eye members tighten on the rope in the previously described forms, so that the tightener will prevent the rope from becoming slack between the tent wall and the peg.

If at any time the rope should become slack, the slack may be taken up by turning the tightener as previously described and drawing it along the rope toward the tent wall, and then releasing it. To release the rope from the peg, it is only necessary to turn the tightener into the dotted line position of Figure 18 and move it towards the peg, whereupon the rope between the tent wall and peg may be slacked and the loop 58 may be removed from the peg.

It will be apparent from the above that I have provided a simple tightening device of very inexpensive construction, and one which will securely clamp the rope and hold it against any tension or stress. The rope may be quickly threaded through the tightener and it may be tightened or released with the least possible effort. In all forms of the invention the parts are so arranged that tension on the rope tends to tighten the grip between the crotch and the eye members, so that the rope cannot slip while the device is in operation. It will also be apparent that I have designed the device to be attached to any type of support, whether it be to one end of the rope itself or a fixed structure. In using the term rope I do so in the broad sense, intending to cover the invention whether applied for rope, line, cable or any other similar member.

Having described my invention, what I claim is:

1. A tightener for rope having means for attachment to a support, said tightener having an eye member, a crotch member disposed substantially parallel to said eye member and having a converging crotch, the apex of which is disposed in a vertical plane adjacent that side of the opening of said eye member which is farthest away from said attaching means, said crotch member extending outwardly and downwardly away from said eye member beyond the apex of said crotch, said eye member and said crotch member being adapted to receive the rope successively therethrough and adapted to move toward each other whereby tension on the main portion of the rope will cause the grip of said crotch and eye members to tighten upon the rope.

2. A tightener for rope having means for attachment to a support, said tightener having an eye member and a crotch member through both of which the rope is adapted to be passed in succession, said eye member and said crotch member lying one over the other, said tightener being constructed whereby the crotch and eye members will be resiliently pressed toward each other, said crotch member having a converging crotch so disposed in relation to the opening of said eye member that the rope passing through said members will be gripped between said eye and crotch members with the rope pressed into said crotch.

3. A tightener for rope having means for attachment to a support, said tightener having an eye member and a crotch member through both of which the rope is adapted to be passed in succession, said eye member and said crotch member lying one over the other, said tightener being constructed whereby the crotch and eye members will be resiliently pressed toward each other, said crotch member having a converging crotch so disposed in relation to the opening of said eye member that the rope passing through said members will be gripped between said eye and crotch members with the rope pressed into said crotch, said eye member and said crotch member being so related and co-operating that tension on the main portion of the rope tends to draw said eye and crotch members toward each other and thereby increase the grip on said rope.

4. A tightener for rope comprising a single piece of metal bent to form an eye, thence bent to form a loop to receive a portion of the rope therethrough for supporting said tightener, said piece of metal being thence bent to form a crotch member lying under and substantially parallel with said eye member, said crotch member having a converging crotch so disposed in relation to the opening of said eye member that the rope passing through said eye and crotch members will be gripped between said members with the rope pressed into said crotch.

5. A rope tightener consisting of a strip of metal bent to form an eye, thence bent to form a plurality of spring coils disposed with their axes substantially at right angles to the axis of said eye member, said strip being thence bent to form a crotch member provided with a converging crotch so disposed that the rope passing successively through said eye and through said crotch will be gripped between said eye and said crotch members with the rope pressed into said crotch, said spring portion tending to force said eye and crotch members toward each other and adapted to receive a portion of the rope therethrough.

6. A rope tightener consisting of a strip of metal bent to form an eye, thence bent to form a plurality of spring coils disposed with their axes substantially at right angles to the axis of said eye member and being thence bent to form a crotch member provided with a converging crotch so disposed that the rope passing successively through said eye and through said crotch will be gripped between said eye and said crotch members with the rope pressed into said crotch, said spring portion tending to force said eye and crotch members toward each other and adapted to receive a portion of the rope therethrough, the ends of said strip of metal being bent around adjacent portions of said strip to lock said eye members and said crotch members.

7. A tightener for rope formed of flat metal, having a portion provided with an opening to constitute an eye member, the metal being rolled around the opening of said eye member to prevent cutting of the rope against the same, said metal strip being bent to form a loop to receive a portion of the rope therethrough for holding said tightener and being then bent to form a member lying adjacent and substantially parallel to said eye member and provided with an opening to receive the rope therethrough, said latter opening having a converging crotch so disposed in relation to the said eye member that the rope passing successively through the eye and crotch will be drawn towards the apex of said crotch.

Signed at the city of Waterville, county of New Haven and State of Connecticut, the fifth day of February, 1930.

RAYMOND R. RUNDELL.